US008047553B2

(12) United States Patent
Voong

(10) Patent No.: US 8,047,553 B2

(45) Date of Patent: Nov. 1, 2011

(54) COLLAPSIBLE ROLLING SUPPORT STAND HAVING A SUPPORT LEG

(75) Inventor: Gary Voong, Chicago, IL (US)

(73) Assignee: Robert Bosch GmbH, Stuttgart (DE)

( * ) Notice: Subject to any disclaimer, the term of this patent is extended or adjusted under 35 U.S.C. 154(b) by 267 days.

(21) Appl. No.: 12/428,084

(22) Filed: Apr. 22, 2009

(65) Prior Publication Data

US 2009/0289429 A1 Nov. 26, 2009

Related U.S. Application Data

(60) Provisional application No. 61/128,565, filed on May 22, 2008.

(51) Int. Cl.
*B62B 1/04* (2006.01)

(52) U.S. Cl. ...... 280/30; 280/639; 280/79.3; 280/47.34; 280/249; 248/129; 248/166

(58) Field of Classification Search .................... 280/30, 280/638, 35, 639, 38, 39, 40, 645, 646, 63, 280/659, 79.11, 79.3, 47.12, 47.34, 641, 280/43, 47.18, 47.21, 47.24, 47.26, 47.28, 280/47.29, 47.33, 8; 70/201; 248/129, 166, 248/631, 647, 676, 98, 101, 121, 248, 137, 248/143, 439; 414/448, 457, 595
See application file for complete search history.

(56) References Cited

U.S. PATENT DOCUMENTS

| | | | | |
|---|---|---|---|---|
| 4,611,823 A | | 9/1986 | Haas | |
| 5,087,013 A | * | 2/1992 | Gress et al. | 248/676 |
| 5,542,639 A | | 8/1996 | Wixey et al. | |
| 6,530,583 B1 | | 3/2003 | Mueller | |
| 6,899,306 B1 | * | 5/2005 | Huang | 248/150 |
| 7,048,296 B1 | * | 5/2006 | Wu | 280/651 |
| 7,077,421 B2 | | 7/2006 | Wu | |
| 7,213,829 B2 | | 5/2007 | Wu | |
| 7,222,865 B2 | | 5/2007 | Chen et al. | |
| D550,476 S | * | 9/2007 | Liu et al. | D34/24 |
| 7,331,596 B2 | | 2/2008 | Tiramani et al. | |
| 7,377,528 B1 | * | 5/2008 | Xie | 280/87.041 |
| 7,487,947 B2 | * | 2/2009 | Liu et al. | 248/439 |
| 7,494,149 B2 | * | 2/2009 | Liu et al. | 280/639 |
| 7,849,966 B2 | * | 12/2010 | Chiu | 182/153 |

(Continued)

FOREIGN PATENT DOCUMENTS

| | | |
|---|---|---|
| EP | 1847358 | 10/2007 |

*Primary Examiner* — Ruth Ilan
*Assistant Examiner* — Karen A Beck
(74) *Attorney, Agent, or Firm* — Greer, Burns & Crain, Ltd.

(57) ABSTRACT

A collapsible folding stand for use with a horizontally oriented object such as a portable table saw that is attached to the stand is capable of being manipulated between open and closed positions. In the open position, the top frame is horizontally oriented. In the closed position, the stand is generally vertically oriented. To move the rolling stand from its open position to its closed position, the user needs only to lift the handle and the top frame will then move to its generally vertical closed position where the latching mechanism can then be engaged. The stand has an integrated support leg that can be selectively positioned and locked to provide increased stability for the stand. The support leg has a locking mechanism, which is operated by a single locking lever and can be adjusted to compensate for wear or degree of force needed to lock the mechanism.

18 Claims, 7 Drawing Sheets

U.S. PATENT DOCUMENTS

2002/0140193 A1* 10/2002 Chai ........................ 280/87.041
2004/0187666 A1 9/2004 Huang
2005/0199768 A1* 9/2005 Tam et al. ..................... 248/129
2008/0067786 A1* 3/2008 Liu et al. ....................... 280/639
2009/0289429 A1* 11/2009 Voong ............................. 280/30
2010/0096530 A1* 4/2010 Chiu ............................. 248/439

* cited by examiner

COLLAPSIBLE ROLLING SUPPORT STAND HAVING A SUPPORT LEG

BACKGROUND OF THE INVENTION

The present invention generally relates to rolling support stands.

Rolling hand trucks or support stands for large and/or heavy objects have been known for decades and are useful for transporting such objects from one location to another. Some of such known support stands are collapsible to some degree and many different designs of the hand trucks or rolling support stands are particularly suited for specific uses. While such products may be used in many different industries and applications, one noteworthy use is that of transporting objects, such as portable table saws, miter saws and the like to and from construction sites.

In the home building trade, carpenters generally have table saws as well as other types of saws that are brought to a jobsite every day in the tradesman's truck or are stored in a secure location at the jobsite and must be removed from the truck or stored location and be set up on the jobsite while work is being done. At the end of the work day, the tradesman must pack up the saw and return it to his truck or secure location for safe keeping. Because such tools are valuable, they cannot be left unattended overnight without a significant risk of theft.

There is also an issue of setting up the saw at the worksite. Even though early prior art roll stands or hand trucks may help the tradesman to move the saw to the desired location, it was often necessary to have a table or other surface, such as wooden planks resting on saw horses or the like to bring the saw to a convenient working height during use. Although more recent designs have evolved which have a rolling stand that can be unfolded to support the saw at an appropriate working height, all known designs that double as a stand require the tradesman to lift a substantial portion of the weight of the saw which is typically relatively heavy.

Many portable table saws are very similar in design to standard table saws except they do not have a stand with legs beneath them and must be supported by a separate structure. Such portable table saws are rugged commercial tools that are built for an extended useful life and are therefore relatively heavy. Typical table saws of this type may weigh 60 pounds or more. While most tradesmen can usually lift 40-60 pounds, such exertion is inconvenient and perhaps dangerous in certain circumstances.

Other types of stands may unfold using a spring biasing mechanism that is released and which then supplies a major force tending to place the stand with the saw attached to it in its proper working generally horizontal position. However, stands of this type may be dangerous if the folded stand has the mechanism released when the weight of the saw is not over the stand mechanism. If there is no load on the mechanism, it can unfold very rapidly which can be quite dangerous if a tradesman or any other person is struck by the mechanism.

SUMMARY OF THE INVENTION

A preferred embodiment of the present invention comprises a collapsible folding stand for use with a horizontally oriented object such as a portable table saw or miter saw that is attached to the stand wherein the stand has a front and a rear portion and is capable of being manipulated between open and closed positions. In the open position, the top frame is horizontally oriented. In the closed position, the stand is generally vertically oriented as is the top frame. To move the rolling stand from its open position to its closed position, the user needs only to lift the handle and the top frame will then move to its generally vertical closed position where the latching mechanism can then be engaged. Because of the mechanism advantage of the folding mechanism, moving between the open and closed positions in either direction requires very little effort by the user.

The preferred embodiment has an integrated support leg that can be selectively positioned and locked to provide increased stability and rigidity for the stand. The support leg has a locking mechanism, which when unlocked does not impede the easy movement between open and closed positions in either direction, and which when locked in the open position provides additional stability to the stand. The locking mechanism is operated by a single locking lever and can be adjusted to compensate for wear or degree of force needed to lock the mechanism.

DETAILED DESCRIPTION

Figure 1:
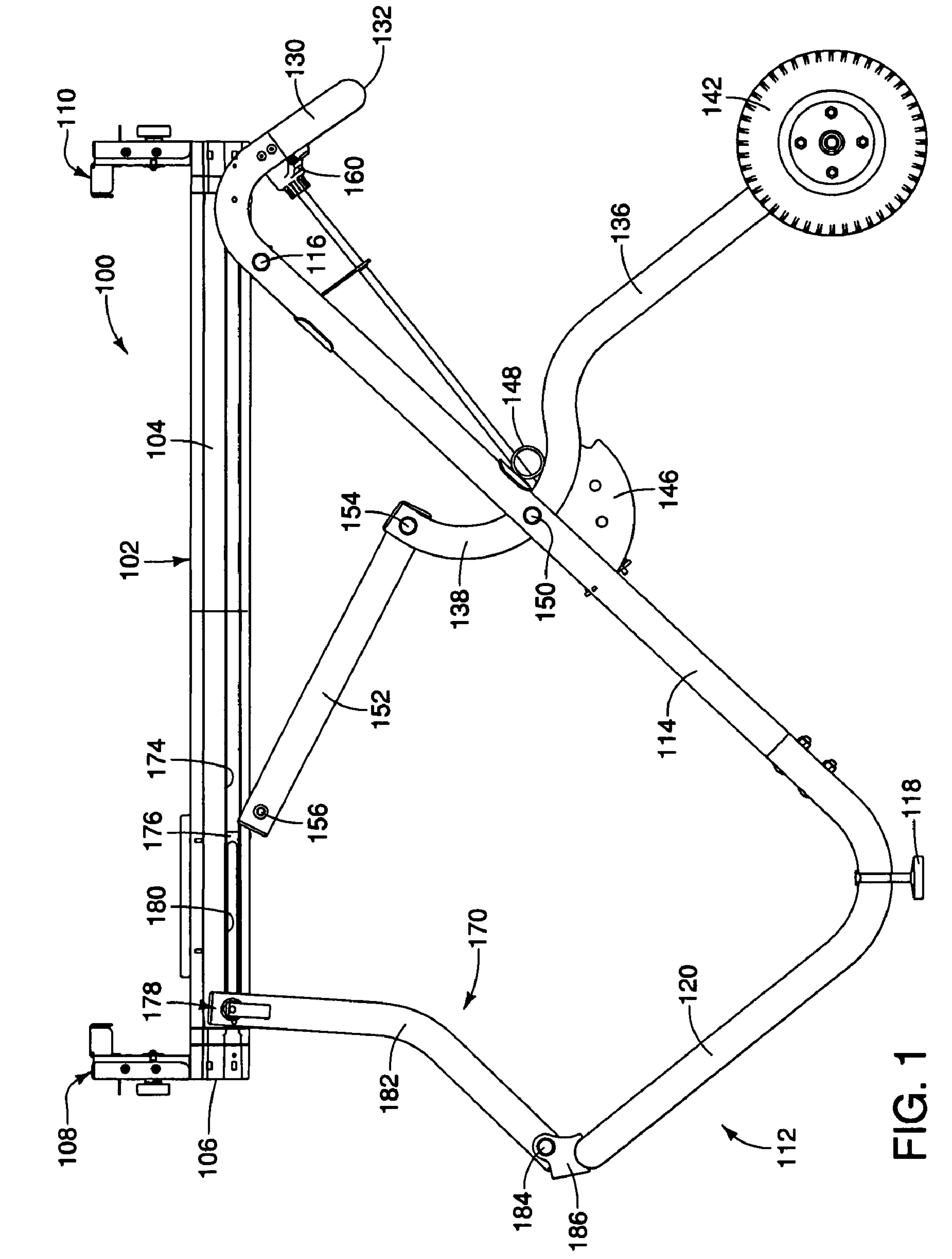
FIG. 1 is a side view of the preferred embodiment of the present invention showing the rolling stand in its fully opened position.

The preferred embodiment of the collapsible rolling stand of the present invention has a top frame upon which an object such as a table saw, miter saw or the like can be attached and a folding mechanism that includes at least first and second members that are pivotable relative to one another and which resemble a scissor movement, with the center of gravity of the object that is attached to the top frame being located between the ground contacting ends of each of the first and second members. This enables the weight of the object to assist the unfolding of the stand which causes the object to move from a generally vertically oriented position to a generally horizontal position. Because the center of gravity of the object is between the ground contacting ends of the first and second members, the stand can be easily folded back to the collapsed generally vertical position without significant exertion by a user performing either operation.

Unlike many prior art rolling stands, the user does not have to provide any heavy lifting in order to set up or break down the stand with the object attached to it. In this regard, a user can completely set up or knock down the stand by holding the handle and gently urging it in one direction or the other to open or close it. It is only necessary to manipulate a locking mechanism to release it from a closed position and to lock it when it has been moved from an opened position to its closed position.

Because the preferred embodiment of the present invention is a stand for relatively heavy objects, such as commercial grade portable table saws that can weigh upwards of 60 pounds or more, there are relatively large forces that are acting on the components of the stand, and the preferred embodiment of the present invention comprises a support leg that is configured to provide increased stability and rigidity for the stand. The support leg has a locking mechanism, which when unlocked does not impede the easy movement between open and closed positions in either direction, and which when locked in the open position provides additional stability to the stand. The locking mechanism utilizes a single locking lever and can be adjusted to compensate for wear or degree of force needed to lock the mechanism.

Turning now to the drawings and particularly FIGS. 1-4, a preferred embodiment of a rolling stand, indicated generally at 100, is shown which has a top frame structure, indicated generally at 102, that comprises side members 104 as well as a front member 106. Two mounting structures 108 and 110 are attached to the frame structure 102 and are configured to engage and hold a table saw that is mounted on the top 102 frame structure.

Figure 5:
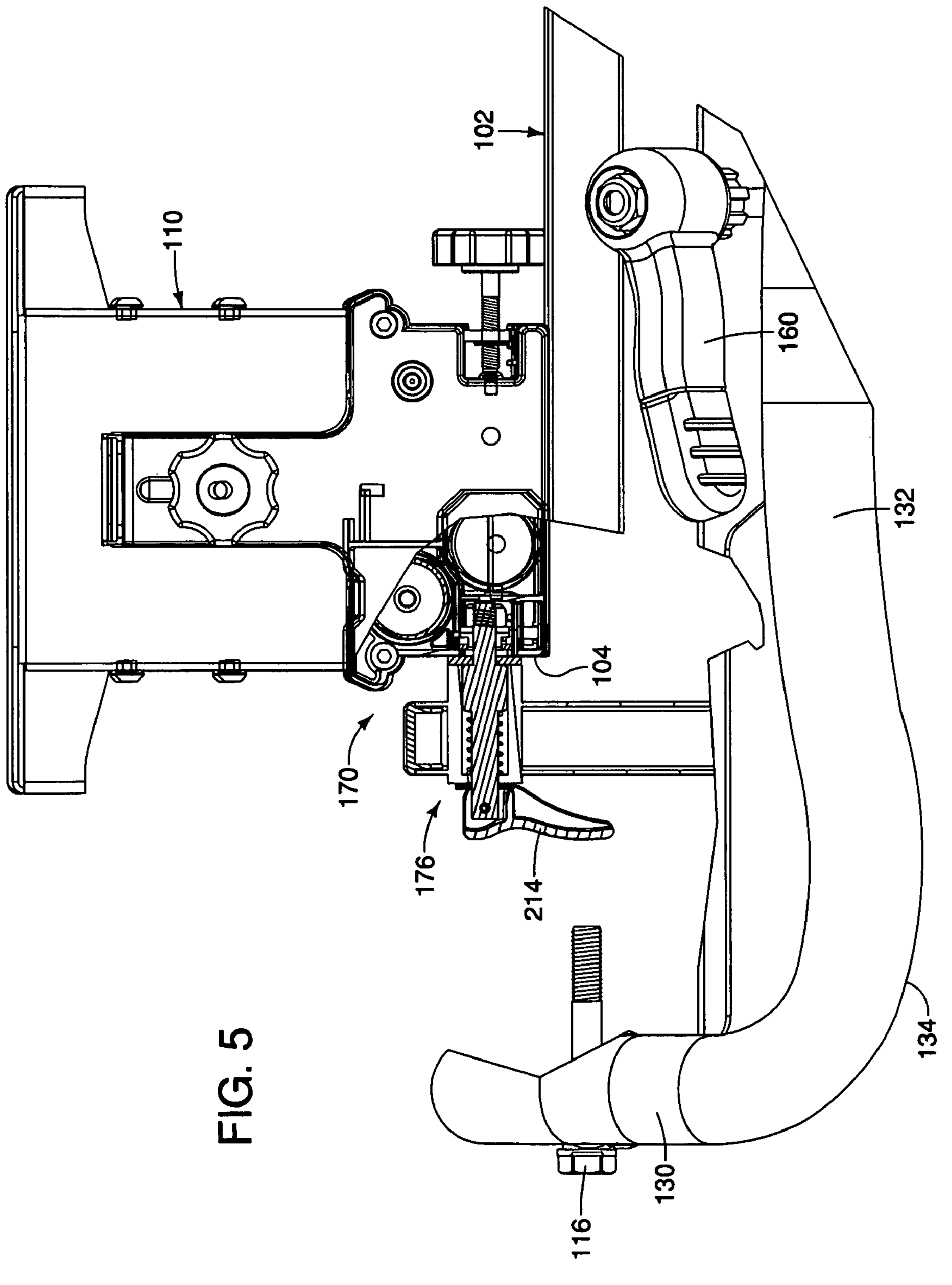
FIG. 5 is a partial front plan view of the preferred embodiment, with portions removed and other portions shown in cross-section.

The embodiment 100 also has a folding mechanism, indicated generally at 112, that includes a main side strut 114 that is pivotally attached to the top frame structure 102 by pivot connection 116 and extends downwardly to a ground contact 118. A transverse extension 120 is also provided and it has an end bridge 122 that interconnects the extension 120 of each side. The main side strut 114 extends upwardly to the connections 116 beyond which they are formed into generally transverse handle extension 130 that merges with a curved handle 132. The handle 132 has a general upward curve as shown in FIG. 5 of the drawings, which is not only ergonomically convenient, but also defines two lower contact points 134 that may facilitate the stand being loaded onto an elevated platform such as a cargo floor of a truck or van.

This embodiment also has a pair of rear legs 136 with curved leg extensions 138 that is angled relative to the rear legs 136. The rear legs 136 also have a wheel 142 attached to the end portion of each side thereof. A rear end brace 144 is provided to interconnect the rear legs 136. Each of the rear legs 136 have a curved auxiliary support plate 146 that is attached to the rear leg 136 and the leg extension 138 and this support member has an inwardly directed stop member 148 that is positioned to engage the main side strut 114 when it reaches its open position as best shown in FIG. 1. Each rear leg 136 is pivotally connected to the side strut 114 by pivot connection 150. A link member 152 is also provided in this embodiment and it has a pivot connection 154 to the end of the rear leg extension 138 and a pivot connection 156 for connecting to the side member 104 of the top frame.

When the rolling stand 100 shown in its open position in FIG. 1 is to be moved to its closed position, the handle 134 must be raised to move the side strut 114 upwardly. The rear leg 136 will then pivot in a clockwise direction around pivot point 150 so that the wheel 142 will begin to approach the lower contact point 118 during the closing operation. Also the rear leg extension 136 will move pivot point 154 in a clockwise direction relative to pivot point 150 and cause the front end of the stand to move downwardly so that end 106 will move in a counterclockwise direction pivoting around the opposite pivot connection 116, resulting in the end 106 approaching the lower end of the side strut 114. The stand is shown in an intermediate position in FIG. 2 and a fully closed position in FIG. 3. From the vertical closed position the opposite series of movements will occur as has been described to return to a horizontal open position shown in FIG. 1. A locking mechanism including a rotatable lever 160 may be provided to lock the stand in its fully open as well as its fully closed position.

The preferred embodiment includes an integrated support leg structure, indicated generally at 170, and is shown in all of the drawings and in detail in FIGS. 5-8. The side members 104 are preferably a relatively complex aluminum extrusion that includes a generally square channel 172 having an outer side slot 174 extending substantially the full length of the side member, although it only needs to be open for the length of a guide track 176 which is installed in the channel 172, and in which a locking mechanism, indicated generally at 178, can slide. The guide track 176 is stationary in the channel and may be held in place by a friction fit, or by crimping, or by a set screw or other fastener. The guide track 176 has a closed ended slot 180 and is configured to receive a component of the locking mechanism 178.

The locking mechanism 178 has components that extend through the slot 174 in the channel 172 as well as the slot 180 in the guide track 176, thereby enabling the locking mechanism to slide relative to the side member 104 when the locking mechanism 178 is unlocked and it is desired to move the stand from its closed position to its open position or vice versa.

The support leg structure 170 has a support leg 182 that has the locking mechanism 178 at its upper end as shown in FIG. 1 and a lower end pivotally attached by pivot connection 184 to a mounting bracket 186 that is connected to the bridge portion 122. The mounting bracket 186 can be welded to the bridge portion or may be mechanically attached to it with bolts, clamps or other fastening mechanism.

Figure 2:
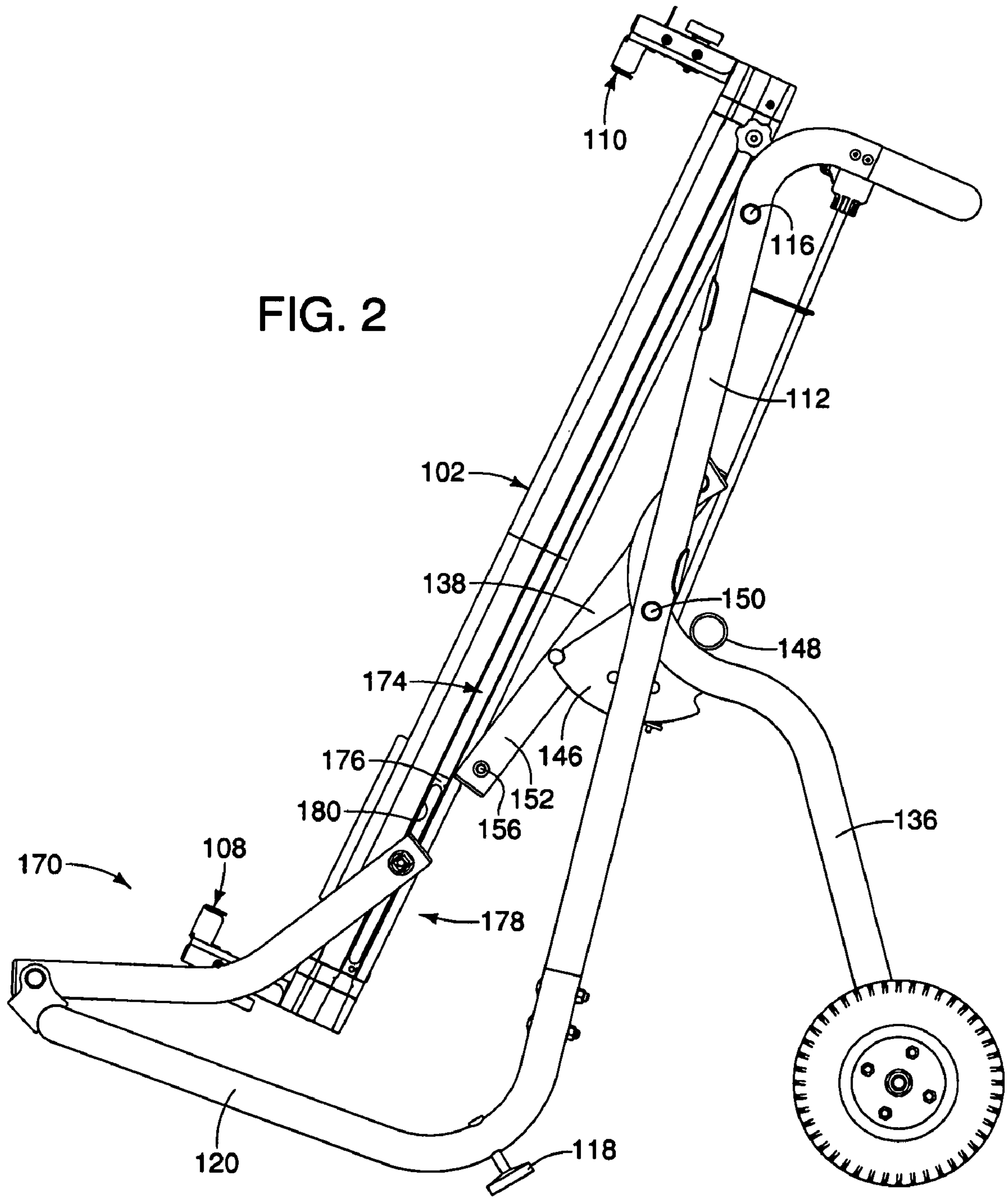
FIG. 2 is a side view of the preferred embodiment of the stand shown in a partially opened position.
Figure 3:
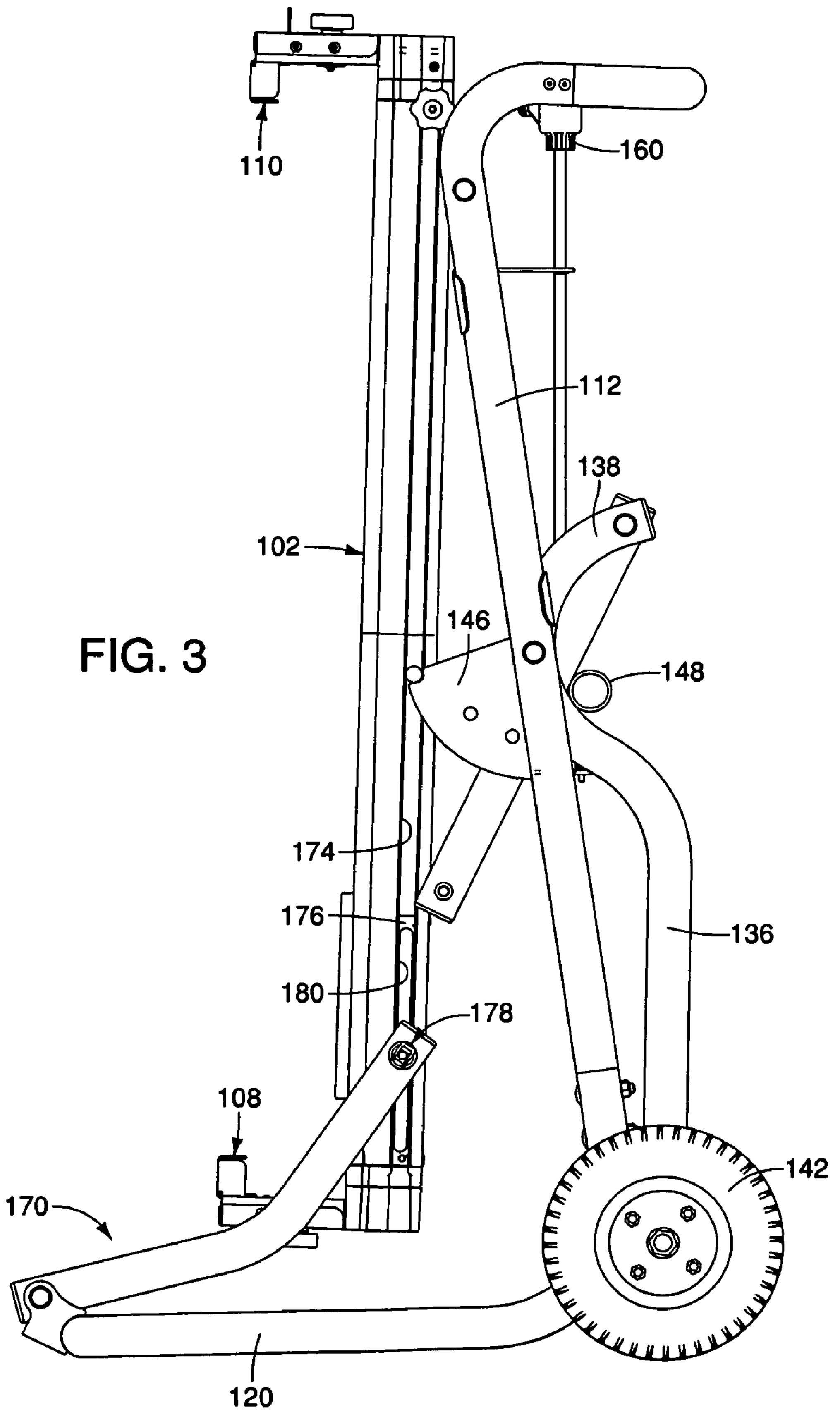
FIG. 3 is a view of the preferred embodiment of the stand in its closed position.
Figure 4:
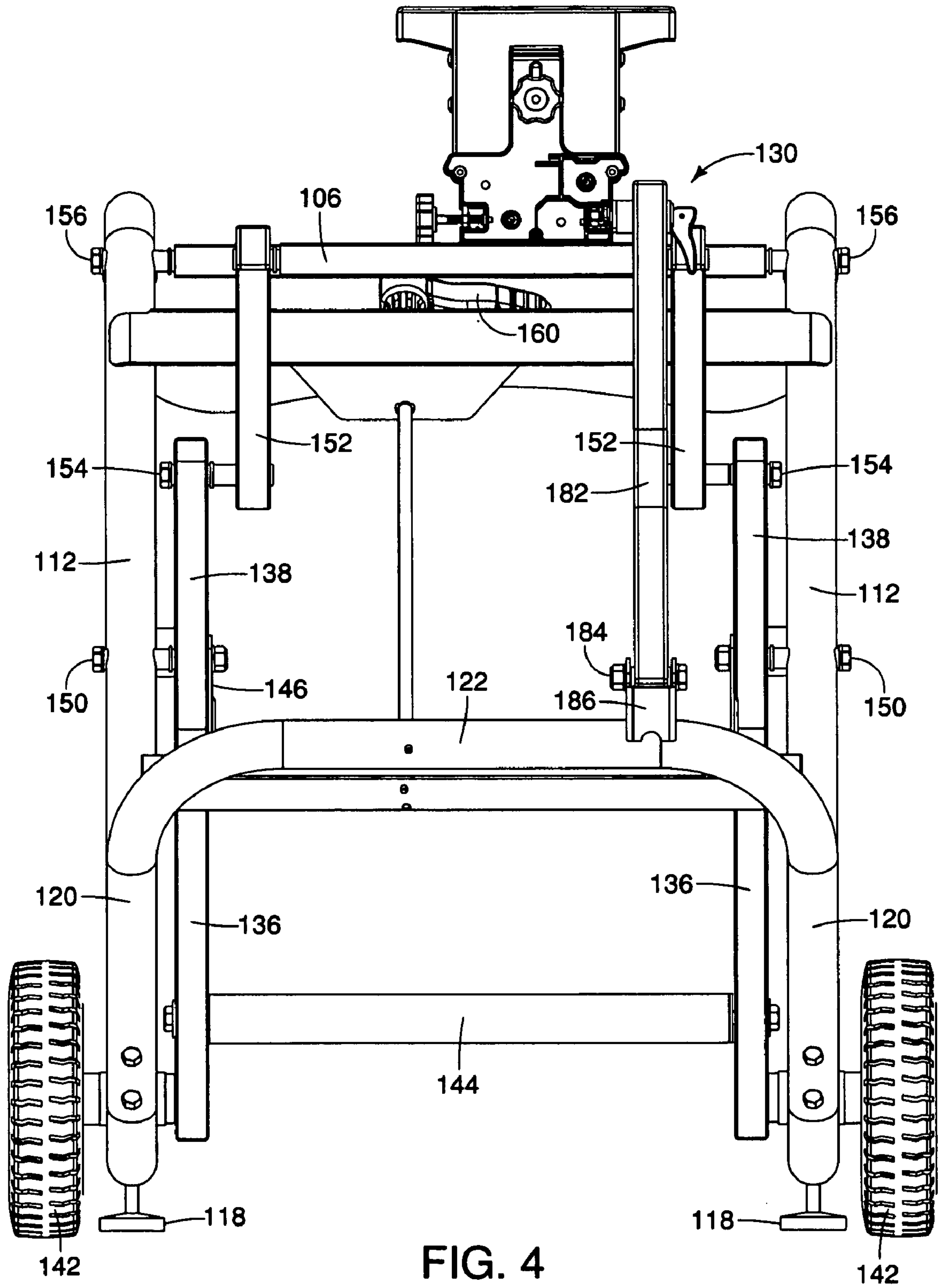
FIG. 4 is a front end view of the preferred embodiment.

The support leg structure 170 therefore provides a support to the front of the top 102 and gives the stand 100 more rigidity and stability. The leg 182 is preferably angled by approximately 20° as shown so that when it is in its support position as shown in FIG. 1, the load is applied generally vertically on the locking mechanism 178 rather than at an angle which would possibly contribute to the locking mechanism and upper end of the leg 182 sliding to the right as shown in FIG. 1. When the locking mechanism 178 is unlocked, the stand can be moved from the open position, shown for example in FIG. 1, to the closed position wherein the locking mechanism 178 will slide along the side member as shown in FIGS. 2 and 3.

Figure 6:
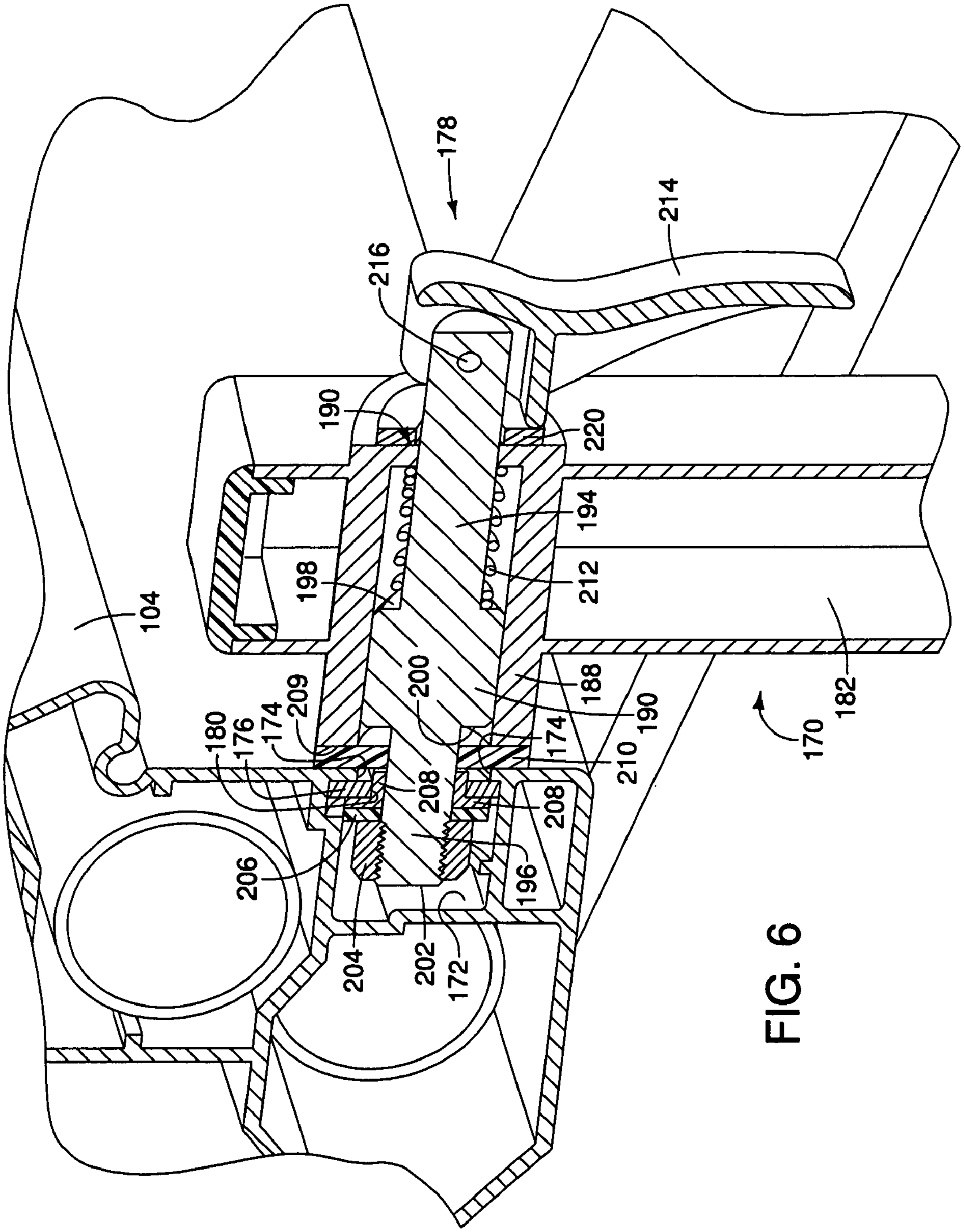
FIG. 6 is an enlarged cross-sectional isometric view of the locking mechanism of the preferred embodiment shown in a locked position.
Figures 7, 8:
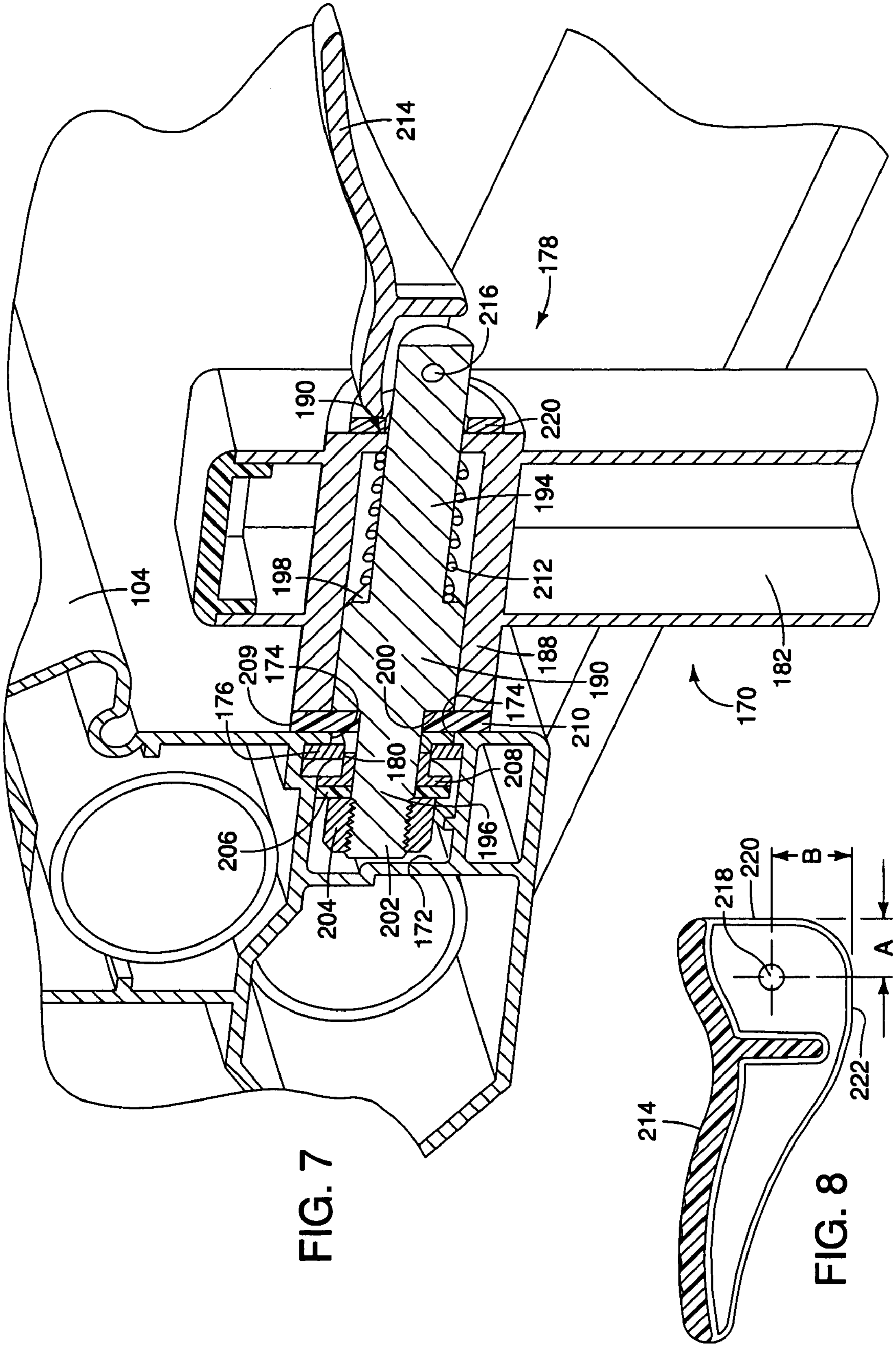
FIG. 7 is an enlarged cross-sectional isometric view of the locking mechanism of the preferred embodiment shown in an unlocked position.
FIG. 8 is a cross-section of the locking lever of the locking mechanism of the preferred embodiment.

With regard to the locking mechanism 178, it is shown in detail in FIGS. 6-8, with FIG. 6 showing it in a locked position and FIG. 7 in an unlocked position. The mechanism includes a cylindrical upper end portion 188 that is preferably formed as part of the leg 182, but may be a separate cylindrical structure that would be attached through an opening in the upper end portion of the leg 182 and attached thereto. Within the cylindrical end portion 188 is a release shaft 190 that has a center portion 192 that is enlarged relative to an outer end portion 194 and an inner end portion 196. The intersection of the center portion 190 and the outer end portion 194 defines an annular shoulder 198 and the intersection of the center portion 190 and the inner end portion 196 forms an annular shoulder 200.

The outer diameter of the center portion 190 is slightly less than the inner diameter of the cylindrical portion 188 and is free to slide within it to lock and unlock the mechanism. The inner end portion 196 has threads 202 for receiving a nylon nut 204, the inner face of which engages a nylon washer 206 that abuts a T-roller 208 that is rotatable on the inner end portion 196 and has an outer surface that rides in the slot 180 of the guide track 176. The cylindrical end portion 188 has an inner face 208 that engages a preferably nylon washer 210 for protecting the extruded aluminum side member 104. The nylon components also exhibit lesser frictional resistance when sliding in the aluminum channel. A spring 212 is provided and bears against the inside end surface of the cylindrical end portion 188 and the shoulder 198 and urges the release shaft 190 to the left as shown in FIG. 6.

A cam lever 214 is pivotally connected to the outer end portion 195 by a roll pin 216 and is shown in a locked position in FIG. 6 and an unlocked position in FIG. 7. The cam lever is shown in cross-section in FIG. 8 and has an aperture 218 in which the roll pin 216 fits. As is evident from FIG. 8, the distance between the outside of the bottom surface 220 and the center of the aperture 218, marked as distance A, is less than the distance from the center of the aperture 218 to the side of the contact surface 222 which means that when the cam lever 218 is moved from its unlocked position in FIG. 7 to its locked position in FIG. 8, will pull the release shaft 190 to the right by an amount equal to the difference between distances A and B and bring the nut 204, washer 206, T-roller 208 into contact with guide track 176 which will in turn contact the inside surface of the wall of the side member 104 in a clamping relation. It should be understood that the nut 204 can be adjusted to vary the amount of force needed to lock the mechanism 178.

The spring 212 urges the release shaft 190 toward its unlocked position so that when the cam lever 214 is moved to the position shown in FIG. 7, the entire locking mechanism 178 is free to slide within the slots 174 and 180.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A collapsible rolling stand for use with an elongated normally horizontally oriented object attached thereto, said stand being supported by a ground surface and having a front end portion and a rear end portion, and being capable of being manipulated between open and closed positions, wherein the object is generally vertically oriented when the stand is closed, and wherein the object is generally horizontally oriented when the stand is in its open position, said stand comprising:

a top frame having a generally planar portion being configured to have the object secured thereto, said top frame planar portion being oriented in a generally horizontal position when said stand is in its open position and a generally vertical position when said stand is moved to its closed position, said top frame having an elongated slot provided on one of opposite side portions near said front end portion and extending generally parallel to said planar portion;

a folding mechanism supporting said top frame, including at least one handle operatively connected to one end portion of a pair of spaced apart elongated first members that have opposite end portions that include points that contact the ground surface and a pair of spaced apart second members each having wheels for enabling a user to roll said stand on the ground surface, said first and second members being pivotally connected to one another and configured so that the weight of the object provides a substantial portion of the necessary force needed to pivot said first and second pairs of members to further separate said ground surface contact points from said wheels and move said stand from said closed position to said open position wherein said top frame planar portion is substantially horizontal;

a transverse extension connected to said first members at said opposite end portions and extending forwardly of said ground contact points; and a support leg having a first end portion and a pivotable first connection to said transverse extension and a second end portion with a pivotable and slidable second connection to said slot in one of said side portions of said top frame, said support leg being adjustable to permit said stand to be manipulated between the open and closed positions without said support leg being disconnected from either said top frame or said first member.

2. A collapsible rolling stand as defined in claim 1 wherein said top frame has a channel portion with said elongated slot located at a front thereof, said channel portion having an inside surface on opposite sides of said slot.

3. A collapsible rolling stand as defined in claim 2 wherein said second connection further comprises a locking mechanism for securing said connection at a desired location along the length of said slot.

4. A collapsible rolling stand as defined in claim 3 wherein said locking mechanism comprises:

a release shaft that is slidable in said second end portion of said leg, said release shaft having first end with a threaded outer end portion which extends into said slot;

a nut located in said channel screwed onto said outer end portion;

a pivotable cam lever attached to a second end being movable between locked and unlocked positions.

5. A collapsible rolling stand as defined in claim 4 wherein said pivotable cam lever contacts said support leg and pulls said release shaft to bring said nut into engagement with said insider surface of said channel portion when said cam lever is moved to said locked position.

6. A collapsible rolling stand as defined in claim 5 wherein said locking mechanism further comprises a compression spring for biasing said release shaft inwardly toward said channel portion so that said nut is moved away from said inner surface.

7. A collapsible rolling stand as defined in claim 6 wherein said spring has one end bearing against a shoulder of said release shaft and an opposite end bearing against a surface of said support leg.

8. A collapsible rolling stand as defined in claim 1 wherein said first connection permits said support leg to pivot relative to said first member.

9. A collapsible rolling stand as defined in claim 1 wherein said folding mechanism further comprises:

said first members are located on each side of said stand and are operatively connected to and pivotable relative to a rear portion of said top frame planar portion;

each of said second members having a pivot connection to one of said first members at a point intermediate the ends of said first member, each second member having one of said wheels connected to a rearward end portion thereof and an extension located forwardly of said pivot connection at a predetermined angle relative to the lengthwise direction of said second member;

a link member pivotally attached to the distal end of said extension and to said top frame planar portion;

a handle connected to one of said top frame planar portion or said first members;

a locking mechanism for releasably holding said stand in at least the closed position;

wherein when said stand is in its closed position, actuating said locking mechanism enables said second member to pivot about said pivot connection causing the weight of the object to move said wheels a short distance away from said top frame planar portion, further movement of said stand in the rearward direction causing said second members and wheel to rotate toward the rear of said stand to the open position where the top frame planar portion is oriented in said substantially horizontal position.

10. A collapsible rolling stand as defined in claim 9 wherein said handle comprises a cross member that extends between and is connected to both of said first members.

11. A collapsible rolling stand as defined in claim 10 wherein said cross member is positioned at an elevation below said top frame planar portion and has a curved shape upwardly from each of said first members.

12. A collapsible rolling stand as defined in claim 11 wherein said first members have a generally transverse downward extension beyond said pivot connection to said top frame member, with said handle being connected to the ends of each downward extension.

13. A collapsible rolling stand as defined in claim 11 wherein said first members and said handle are an integrally formed unitary structure.

14. A collapsible rolling stand as defined in claim 9 wherein said locking mechanism comprises a sliding pin having an operating knob operatively attached to one of said first and second members that is configured to operatively engage the other of said first and second members when said stand is in at least its closed position.

15. A collapsible rolling stand as defined in claim 1 wherein said transverse extensions includes a generally linear portion connected to and extending from each said first members and a bridge interconnecting opposite ends of said linear portions.

16. A collapsible rolling stand as defined in claim 1 further comprising a spring for biasing said stand toward its closed position when in its open position, such that an operator is not required to exert more than a small force to move said stand to its closed position.

17. A collapsible rolling stand as defined in claim 1 wherein said top frame planar portion comprises said opposite side frame members and two end frame members interconnected in a generally planar rectangular configuration.

18. A collapsible rolling stand for use with an elongated normally horizontally oriented heavy object attached thereto, said stand being supported by a ground surface and having a front end portion and a rear end portion, and being capable of being manipulated between open and closed positions, wherein the object is generally vertically oriented when the stand is closed, and wherein the object is generally horizontally oriented when the stand is in its open position, said stand comprising:

a top frame having a generally planar portion being configured to have the object secured thereto, said top frame planar portion being oriented in a generally horizontal position when said stand is in its open position and a generally vertical position when said stand is moved to its closed position;

a folding mechanism supporting said top frame, including at least one handle operatively connected to one end portion of a pair of spaced apart elongated first members that have opposite end portions that include points that contact the ground surface and a pair of spaced apart second members each having wheels for enabling a user to roll said stand on the ground surface, said first and second members being pivotally connected to one another and configured so that the weight of the object provides a substantial portion of the necessary force needed to pivot said first and second pairs of members to further separate said forward contact point from said rear wheels and move said stand from said closed position to said open position wherein said top frame planar portion is substantially horizontal;

said first members being located on each side of said stand and operatively connected to and pivotable relative to a rear portion of said top frame planar portion;

each of said second members having a pivot connection to one of said first members at a point intermediate the ends of said first member, each second member having one of said wheels connected to a rearward end portion thereof and an extension located forwardly of said pivot connection at a predetermined angle relative to the lengthwise direction of said second member;

a link member pivotally attached to the distal end of said extension and to said top frame planar portion;

at least one handle connected to one of said top frame planar portion or said first members;

a locking mechanism for releasably holding said stand in at least the closed position;

said first members having a generally transverse extensions at said ground engaging opposite ends and at least one front end bridge interconnecting said opposite ends;

a support leg having a first end portion and a first connection to one of said first members and a second end portion with a second connection to said top frame, said support leg being adjustable to permit said stand to be manipulated between the open and closed positions without said support leg being disconnected from either said top frame or said first member;

wherein when said stand is in its closed position, actuating said locking mechanism enables said second member to pivot about said pivot connection causing the weight of the object to move said wheels a short distance away from said top frame planar portion, further movement of said stand in the rearward direction causing said second members and wheel to rotate toward the rear of said stand to the open position where the top frame planar portion is oriented in said substantially horizontal position.

* * * * *